(12) United States Patent
Welker

(10) Patent No.: US 10,506,172 B2
(45) Date of Patent: Dec. 10, 2019

(54) CAMERA SETTING ADJUSTMENT BASED ON PREDICTED ENVIRONMENTAL FACTORS AND TRACKING SYSTEMS EMPLOYING THE SAME

(71) Applicant: GOOGLE INC., Mountain View, CA (US)

(72) Inventor: Stefan Welker, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/679,649

(22) Filed: Aug. 17, 2017

(65) Prior Publication Data
US 2018/0054559 A1 Feb. 22, 2018

Related U.S. Application Data

(60) Provisional application No. 62/376,084, filed on Aug. 17, 2016.

(51) Int. Cl.
*H04N 5/235* (2006.01)
*G06K 9/00* (2006.01)
*H04N 5/232* (2006.01)

(52) U.S. Cl.
CPC ....... *H04N 5/2352* (2013.01); *G06K 9/00671* (2013.01); *H04N 5/232* (2013.01);
(Continued)

(58) Field of Classification Search
CPC .. H04N 5/2352; H04N 5/23222; H04N 5/235; H04N 5/23258; H04N 5/232;
(Continued)

(56) References Cited

U.S. PATENT DOCUMENTS 6,064,749 A * 5/2000 Hirota .................. G06F 3/011
345/7
7,796,872 B2 * 9/2010 Sachs .................. G03B 17/00
348/208.99

(Continued)

FOREIGN PATENT DOCUMENTS

CN 1159006 A 9/1997
CN 101304489 A 11/2008
(Continued)

OTHER PUBLICATIONS

International Search Report and Written Opinion received for PCT Patent Application No. PCT/US2017/047336, dated Oct. 24, 2017, 13 pages.

(Continued)

*Primary Examiner* — Padma Haliyur
(74) *Attorney, Agent, or Firm* — Brake Hughes Bellermann LLP

(57) ABSTRACT

Systems, devices, methods, computer-readable storage media, and electronic apparatuses for camera setting adjustment based on predicted environmental factors are provided. An example system includes a camera assembly, at least one processor, and memory storing instructions. When executed by the at least one processor, the instructions may cause the system to determine a direction of movement of the camera assembly. The instructions may also cause the system to predict environmental factors based on the direction of movement. Additionally, the instructions may cause the system to determine camera settings based on the environmental factors. The instructions may also capture an image with the camera assembly using the determined camera settings. In some implementations, the captured image is used to track or one or more entities.

19 Claims, 10 Drawing Sheets

(52) U.S. Cl.
CPC ........... *H04N 5/235* (2013.01); *H04N 5/2351* (2013.01); *H04N 5/23216* (2013.01); *H04N 5/23222* (2013.01); *H04N 5/23258* (2013.01); *H04N 5/2356* (2013.01)

(58) Field of Classification Search
CPC ............. H04N 5/23216; H04N 5/2351; H04N 5/2356; G06K 9/00671; G06T 7/246
See application file for complete search history.

(56) References Cited

U.S. PATENT DOCUMENTS

| | | | |
|---|---|---|---|
| 2005/0057666 | A1 | 3/2005 | Hu et al. |
| 2012/0157200 | A1* | 6/2012 | Scavezze ............... H04N 5/225 463/31 |
| 2012/0162424 | A1 | 6/2012 | Murao et al. |
| 2014/0176789 | A1 | 6/2014 | Kubota |
| 2014/0307117 | A1 | 10/2014 | Feng et al. |
| 2017/0019608 | A1* | 1/2017 | Ono ................... H04N 5/23254 |

FOREIGN PATENT DOCUMENTS

| | | |
|---|---|---|
| CN | 104137529 A | 11/2014 |
| EP | 1763229 A2 | 3/2007 |
| WO | 2013/121073 A1 | 8/2013 |
| WO | 2015141487 A1 | 9/2015 |

OTHER PUBLICATIONS

Akhavan, Tara, et al., "A framework for HDR stereo matching using multi-exposed images", HDRi2013—First International Conference and SME Workshop on HDR Imaging, 2013, 4 pages.

Suan, Haike, et al., "Object Tracking and Motion Prediction Technology for Digital Camera", Ricoh Technical Report, No. 41, Feb. 2016, pp. 19-30.

Sun, Ning, "HDR Image Construction From Multi-Exposed Stereo LDR Images", 17th IEEE, International Conference on Image Processing (ICIP), Dec. 3, 2010, 4 pages.

Troccoli, Alejandro, et al., "Multi-View Multi-Exposure Stereo", ResearchGate (https://www.researchgate.net/publication/221625848_Multi-View_Multi-Exposure_Stereo), Jun. 2006, 9 pages.

Zhang, Li, et al., "High-Quality Video Denoising for Motion-Based Exposure Control", Mobile Cloud Visual Media Computing, Chapter 2, 2015, pp. 45-59.

International Preliminary Report on Patentability for PCT Application No. PCT/US2017/047336, dated Jul. 2, 2018, 15 pages.

Extended European Search Report for European Application No. 19188128.3, dated Oct. 23, 2019, 13 pages.

First Office Action with English translation for Chinese Application No. 201780001119.2, dated Oct. 8, 2019, 20 pages.

* cited by examiner

CAMERA SETTING ADJUSTMENT BASED ON PREDICTED ENVIRONMENTAL FACTORS AND TRACKING SYSTEMS EMPLOYING THE SAME

CROSS-REFERENCE TO RELATED APPLICATIONS

This application claims priority to U.S. Provisional Application No. 62/376,084, titled PREDICTIVE ADAPTIVE CAMERA EXPOSURE, AND TRACKING SYSTEMS EMPLOYING THE SAME and filed on Aug. 17, 2016, the entire contents of which are hereby incorporated herein by reference.

BACKGROUND

An augmented reality (AR) system can generate an immersive augmented environment for a user. The immersive augmented environment can be generated by superimposing computer-generated images on a user's field of view of the real world. For example, the computer-generated images can include labels, textual information, sprites, and three-dimensional entities.

These images may be displayed at a position in the user's field of view so as to appear to overlay an object in the real world. An AR system may include a tracking system to identify the location of the user or other objects in the real world. For example, the tracking system may use images captured of the real-world environment to determine where a person or object is located and/or moving.

SUMMARY

This description relates to camera setting adjustment based on predicted environmental factors. In a non-limiting example, the predicted environmental factors are determined based on the movement of the camera.

An example implementation is a system comprising a camera assembly, at least one processor, and memory storing instructions. When the instructions are executed by the at least one processor, the instructions cause the system to determine a direction of movement of the camera assembly. The instructions also cause the system to predict environmental factors based on the direction of movement. Additionally, the instructions cause the system to determine camera settings based on the environmental factors and capture an image with the camera assembly using the determined camera settings.

Another example implementation is a non-transitory computer-readable storage medium comprising instructions stored thereon. The instructions, when executed by at least one processor, are configured to cause a computing system to capture a first image with a camera of a moving camera assembly. The instructions are also configured to cause the computing system to predict a future location of the moving camera assembly. Additionally, the instructions are configured to cause the computing system to predict a light level at the predicted future location. The instructions are also configured to cause the computing system to determine exposure settings based on the predicted light level and capture a second image with the camera using the determined exposure settings.

Yet another aspect is a method of tracking an entity. The method includes the step of capturing a first image with a camera of a moving camera assembly. The method also includes predicting a location of the moving camera assembly. Additionally, the method includes the steps of predicting a future field of view of the camera based on the predicted location of the moving camera assembly and predicting environmental factors within the predicted future field of view. The method also includes the steps of determining camera setting based on the predicted environmental factors and capturing a second image with the camera using the determined camera settings.

The details of one or more implementations are set forth in the accompanying drawings and the description below. Other features will be apparent from the description and drawings, and from the claims.

DETAILED DESCRIPTION

Figure 1:
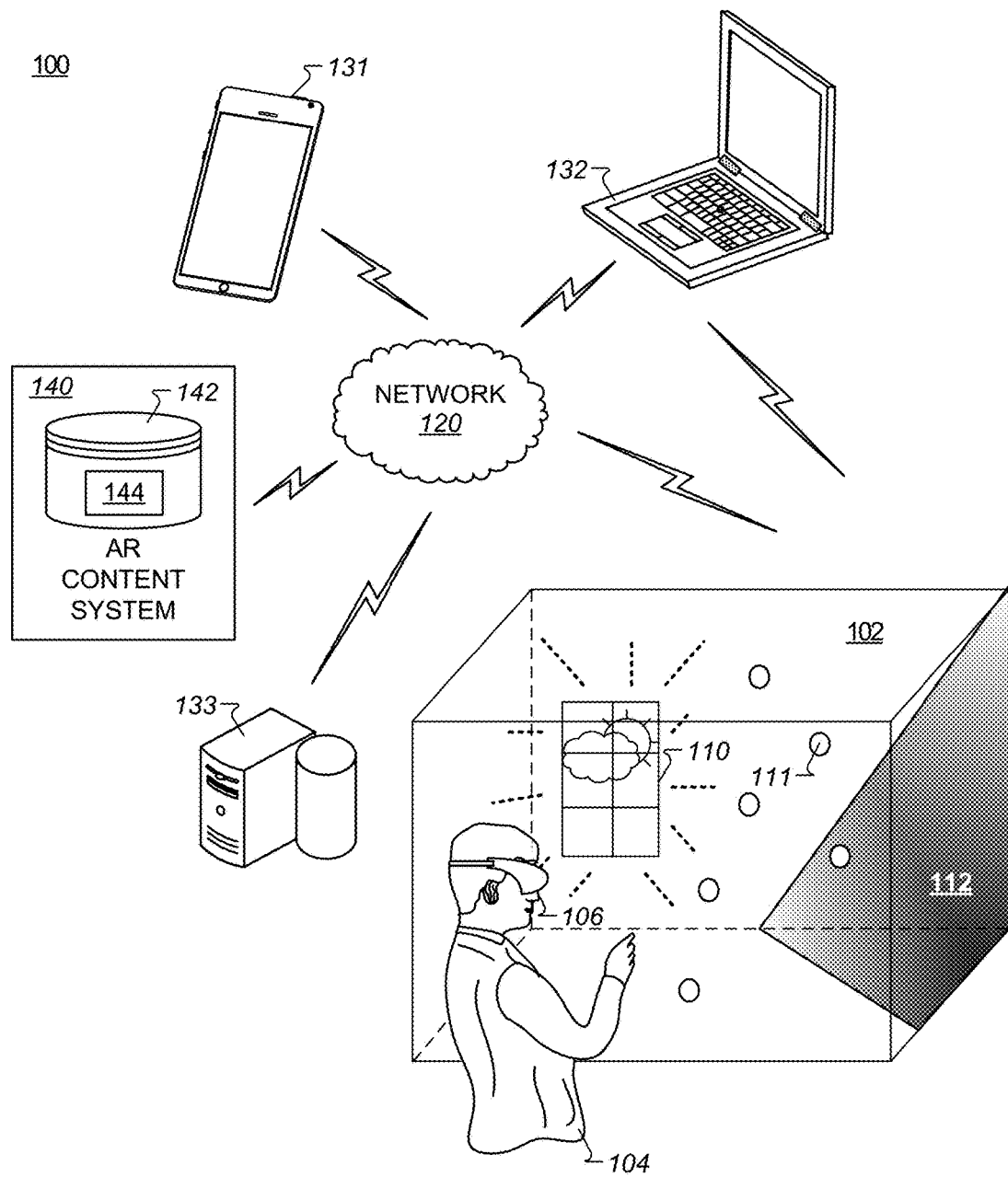
FIG. 1 is a block diagram of an example augmented reality (AR) system having a physical environment, and a tracking system for tracking movement in the physical environment in accordance with this disclosure.

While examples are disclosed herein in connection with tracking systems and augmented reality (AR) systems, the examples disclosed herein may also be used in connection with virtual reality (VR) systems, handheld AR or VR systems, mapping systems, head mounted systems, tracking systems for robots (e.g., flying robots, moving robots, walking robots, driving robots, etc.), etc.

Broadly speaking, tracking systems use features (e.g., corners, edges, borders, objects, etc.) detected in images (e.g., 150-300 features per image), and the movement of those features from image-to-image to determine where a person or object is located and/or moving. Various camera settings may affect how well features can be extracted from images captured by the camera. For example, adjusting settings related to exposure, such as gain and shutter speed, based on lighting conditions can improve feature detection. Other non-limiting examples of camera settings that may be adjusted include white balance, light sensitivity, focus, zoom, etc. Many of the examples herein relate to adjusting an exposure setting of a camera, but implementations are possible that adjust these other settings as well.

Feature extraction from images for tracking purposes may be improved by adjusting the settings of a camera to match the environment (e.g., setting a camera to the proper exposure) to enable trackable features in an image to be better detected. There are different tradeoffs to setting gain and shutter parameters of a camera. Gain increases brightness and contrast but may increase noise in an image. Shutter speed can affect brightness and contrast, but longer exposure times may result in images exhibiting motion blur during movement, which may make detecting features hard or even impossible.

When cameras are used with a tracking system in an environment that has areas having significant differences in light level (e.g., an environment having a window and a dark corner), delay in the auto-adjustment of camera settings, such as exposure settings, can lead to loss of image-based feature detection during movement. Loss, albeit temporary, of feature detection may make it necessary to use motion prediction during such delays during auto-determination of camera settings. In some instances, it may take a few image frames for auto-adjustment to occur, which can cause drift between where the camera is actually located or pointed, and where the tracking system determines the camera is located or pointed. Problems may be made worse when color cameras are used. Additionally, conventional auto-adjustment of camera settings can also lead to adjusting settings in a manner that is detrimental to feature tracking. For example, using conventional auto-adjustment techniques, a camera that has a field of view that includes a brighter window area in a darker room may adjust exposure settings based on the brighter window area (which may not include any usable features) even if doing so is detrimental to tracking usable features within the darker room.

Example predictive adjustment of camera settings, such as exposure settings, and example tracking systems employing the same that overcome at least these challenges are disclosed herein. In some implementations, a predicted location of a moving camera is determined and used to determine camera settings. These camera settings are then used to capture one or more images. As an example, a first location of a moving camera is predicted, while the camera is moving, an exposure setting for the first location of the camera is determined, and a picture is taken with the camera at a second location using the exposure setting. For instance, it can be predicted that the camera is being moved from a bright window down toward a dark corner. In response to determining the camera is moving to the dark corner, setting(s) of the camera, such as exposure settings(s), can be predictively adjusted for less light before the camera is even pointed at or toward the darker area, and before the camera would have auto-adjusted. Because camera settings, such as exposure settings, are predictively set ahead of time, lost image frames, drift, and gaps in feature tracking can be reduced.

Additionally or alternatively, some implementations include a camera assembly that includes multiple cameras. The cameras may use different camera settings, such as exposure settings. For instance, darker parts of a scene (e.g., a dark corner) can be well imaged (e.g., show an ample number of features) by a camera adjusted for less light, while brighter parts (e.g., a brightly lit window) can be well imaged by another camera adjusted for more light. Because the cameras are adjusted for different amounts of light, feature detection can be performed across the scene with less sensitivity to light level. Additionally, movement within the scene can be made without loss of images and feature detection. These examples are contrary to conventional tracking systems that instead use the same exposure settings and/or other camera settings for both cameras. In some implementations, camera settings are determined based on a predicted future location of the camera assembly. For example, main camera settings may be determined based on the predicted future location of the camera assembly. One of the cameras may be configured to use camera settings that are determined by offsetting the camera settings in a first direction (e.g., a negative offset) and the other camera may be configured to use camera settings that are determined by offsetting the camera settings in a second direction (e.g., a positive offset).

Additionally or alternatively, the camera assembly may perform an optimization routine. For example, features can be extracted from the images captured by the multiple cameras. Quality scores can be calculated for the features and or the images. Then, the camera settings of cameras can be adjusted based on which of the images had a higher quality score. In some implementations, this process is repeated continuously or on intervals so as to allow for constant adjustment of the camera settings to better fit the environment.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

Turning to FIG. 1, a block diagram of an example AR system 100 for creating and enabling a user to interact with a three-dimensional (3D) AR environment 102 is shown. The AR system 100 enables the user 104 to interact with physical (e.g., real) objects in the environment 102 as well as virtual objects that are seen together (e.g., composed together) with the physical objects via, for example, a head mounted display (HMD) 106, a tablet computer, a smartphone, a laptop computer, etc. The AR system 100 enables the user 104 to view (e.g., see) the physical objects together with the virtual objects such that the virtual objects augment the physical objects in the environment 102. For example, information about a physical object may be presented within the user's field of view at or near the location of the physical object.

The example environment 102 of FIG. 1 includes a window 110 on a back wall of the environment 102, a plurality of other features (e.g., objects, borders, edges, corners, etc.), one of which is designated at reference numeral 111, and a dark corner 112. For purposes of discussion, references will be made to the example environment 102, however, other environments could be used. Likewise, the example images of different portions of the environment 102 and/or with different camera settings, such as exposure settings, shown and discussed herein are mere examples of images that could be taken.

Figure 2:
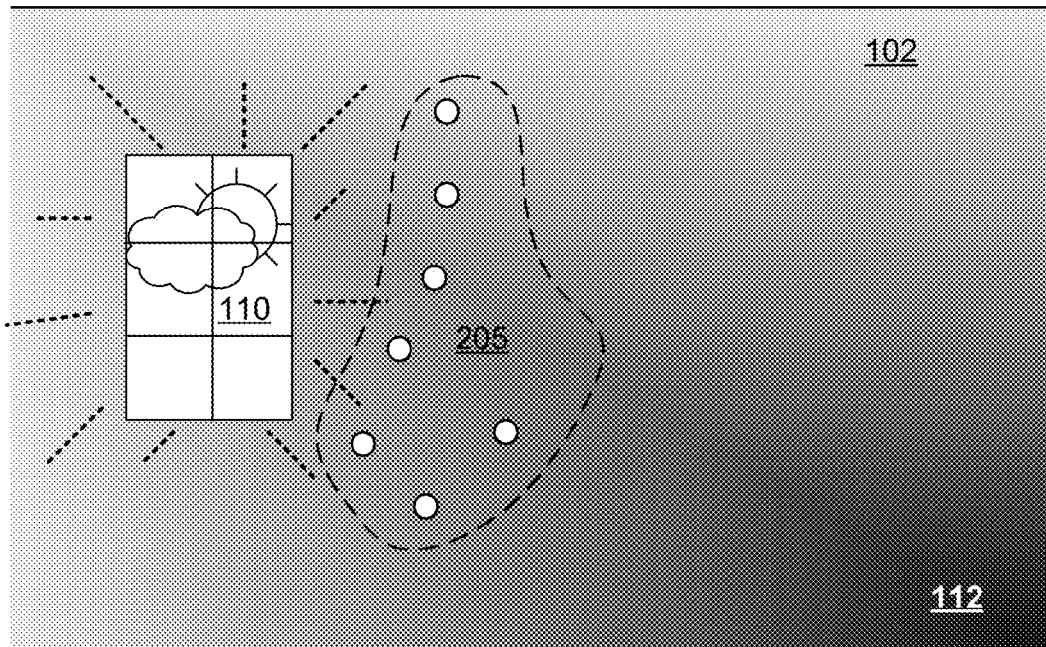
FIG. 2 is an illustration of an example picture of a portion of the environment of FIG. 1 taken using an exposure setting.
Figure 3:
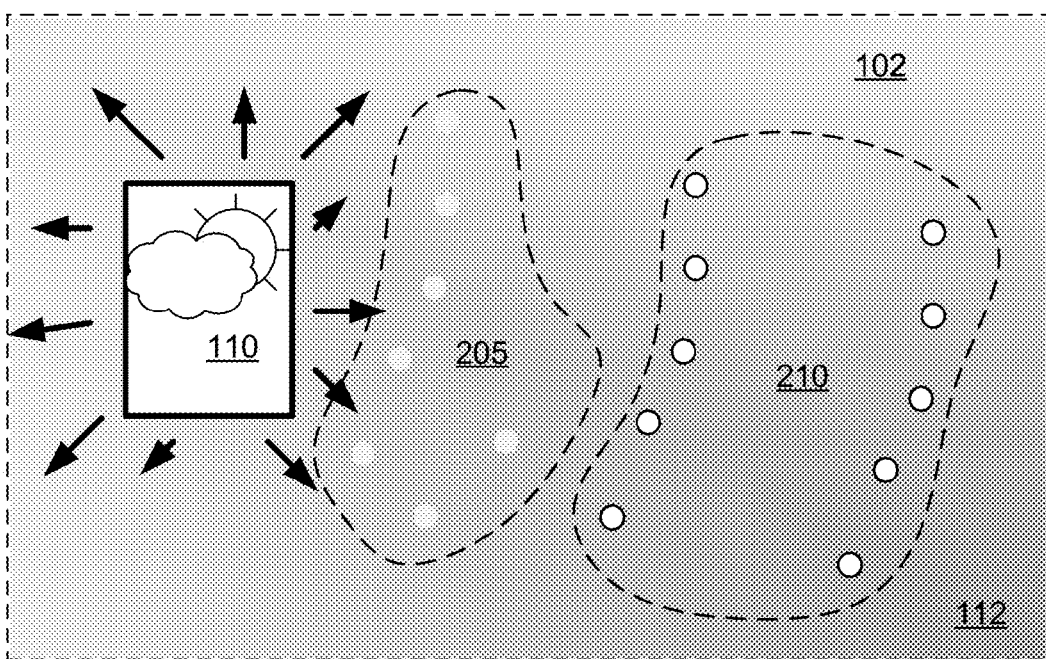
FIG. 3 is an illustration of another example picture of the portion of FIG. 2 taken using another exposure setting.

As shown in FIGS. 2 and 3, images taken of the back wall of the environment 102 with different exposure settings show different features and/or show the features differently. In FIG. 2, an exposure setting is used that allows aspects of the window 110 and features 205 (which are outlined with a dashed line so that they can be identified) near the window 110 to be seen, but not features located to the right of the window 110 near the dark corner 112. In FIG. 3, an exposure setting is used that allows features 210 (which are outlined with a dashed line so that they can be identified) near the dark corner 112 to be seen, while details associated with the window 110 and the features 205 near the window 110 are not clearly visible (e.g., are significantly over-exposed).

Figure 4:
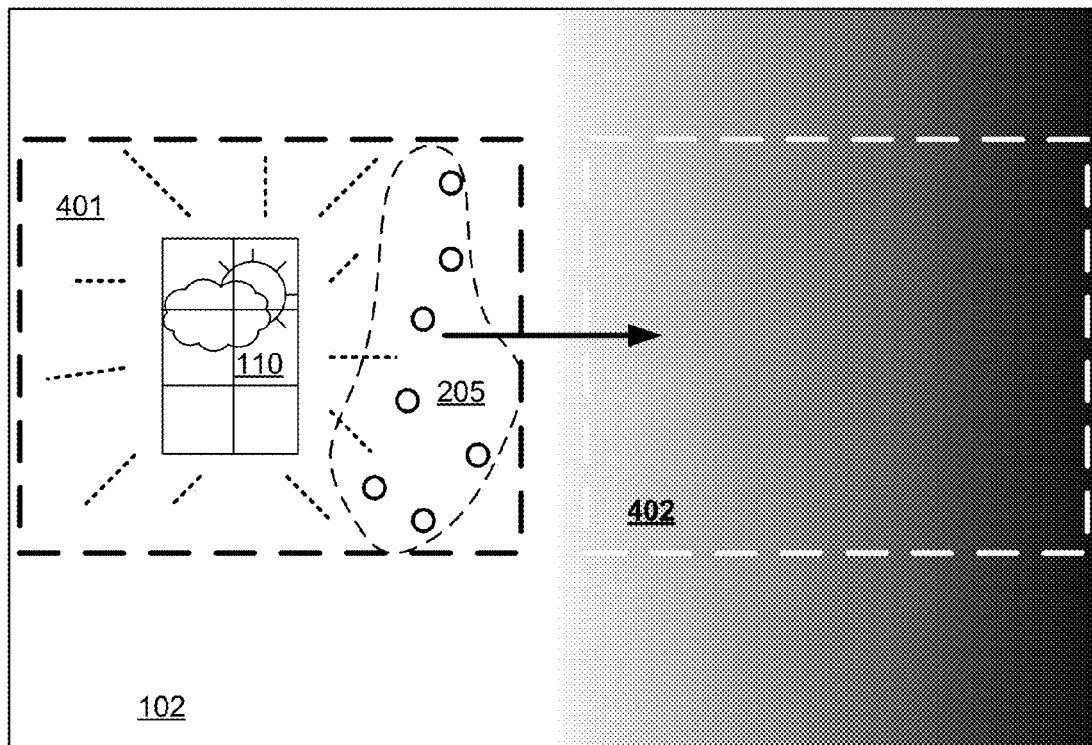
FIGS. 4, 5 and 6 collectively illustrate a sequence of example pictures taken of two different portions of the environment of FIG. 1 with different exposure settings.
Figure 5:
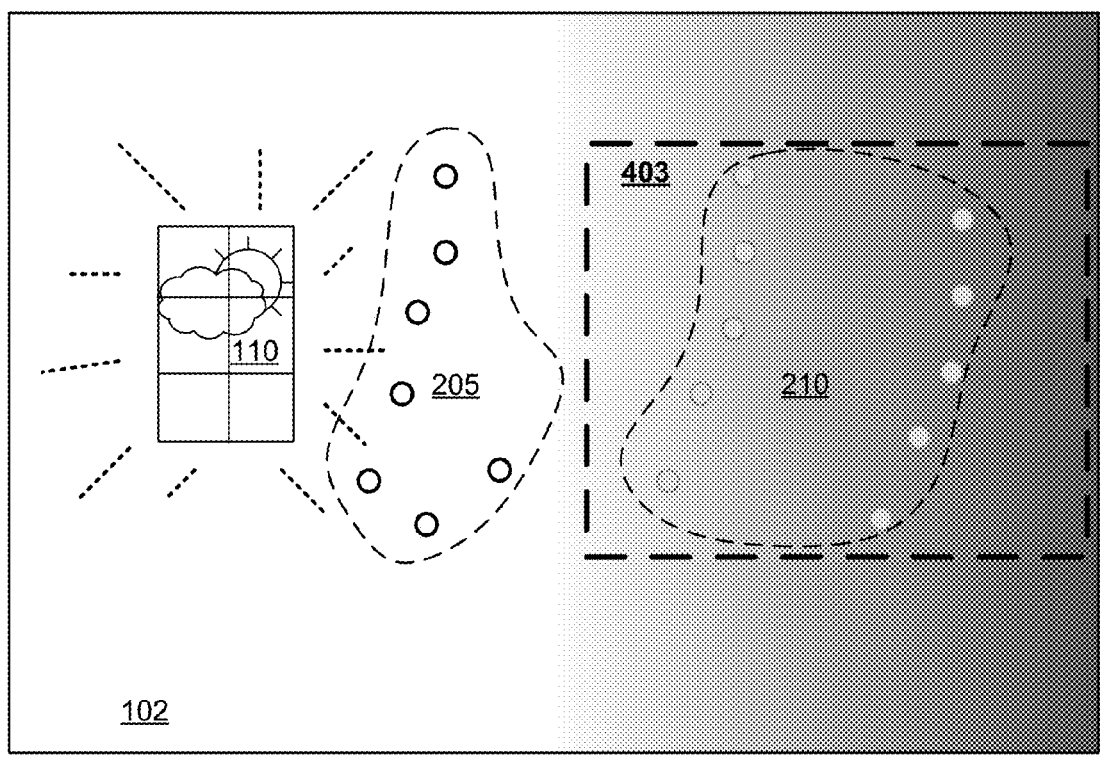
Figure 6:
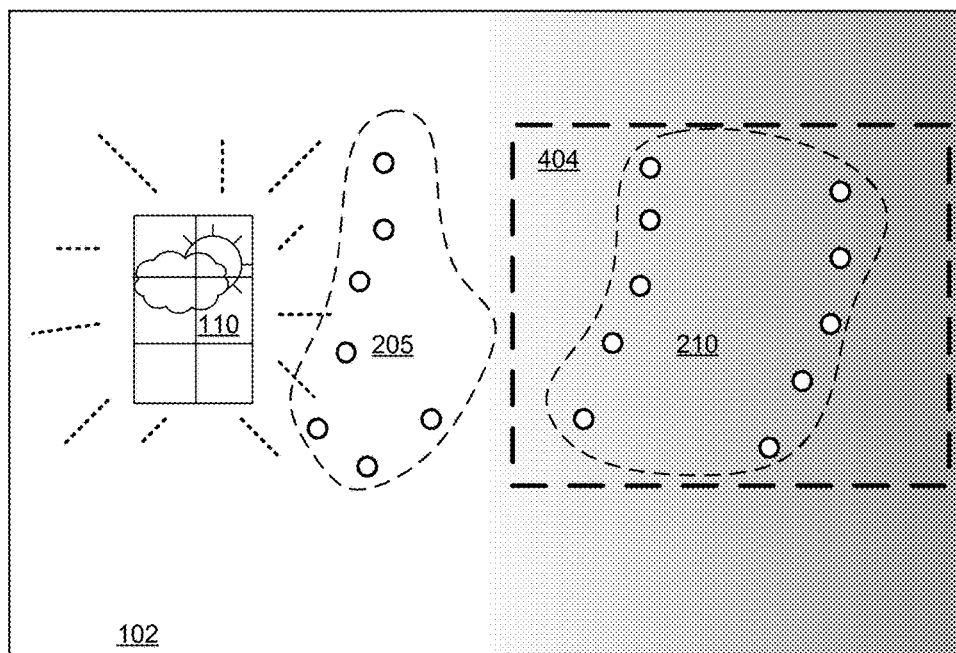

FIGS. 4-6 show a sequence of images taken of different portions of the environment 102 with different settings, such as exposure settings. In FIG. 4, a first image 401 is taken of a leftward portion of the back wall of the environment 102 with camera settings, such as exposure settings, similar to those of FIG. 2. The camera is then moved or rotated to take a second image 402 of a rightward portion of the back wall. Because the camera has not begun auto-adjusting the exposure setting(s), the second image 402 is mainly dark and the features 210 (see FIG. 3) are not detectable in the second image 402. As the camera continues to auto-adjust the exposure setting(s), a third image 403 is taken, as shown in FIG. 5. Because the exposure setting(s) have been adjusted for less light, the features 210 begin to appear in the third image 403, but are not fully detectable. For a fourth image 404 shown in FIG. 6, the camera has auto-adjusted settings, including exposure settings, to be similar to those of FIG. 3, and the features 210 can be accurately detected. Because in the example of FIGS. 4-6 it takes two additional images for the camera to auto-adjust exposure setting(s), a tracking system that depends on all of the images of FIGS. 4-6 will have two unusable images that can cause undesirable drift between where the camera is actually located or pointing, and where the tracking system determines the camera is located or pointing.

Figure 7A:
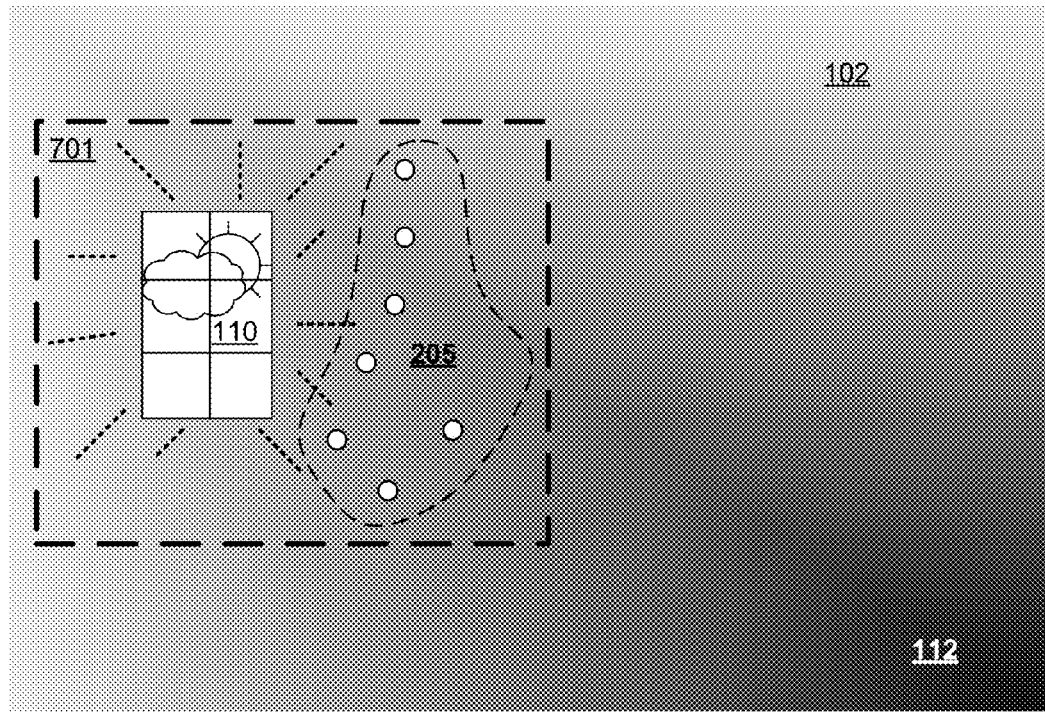
FIGS. 7A and 7B collectively illustrate another sequence of example pictures taken of two different portions of the environment of FIG. 1 with different exposure settings.
Figure 7B:
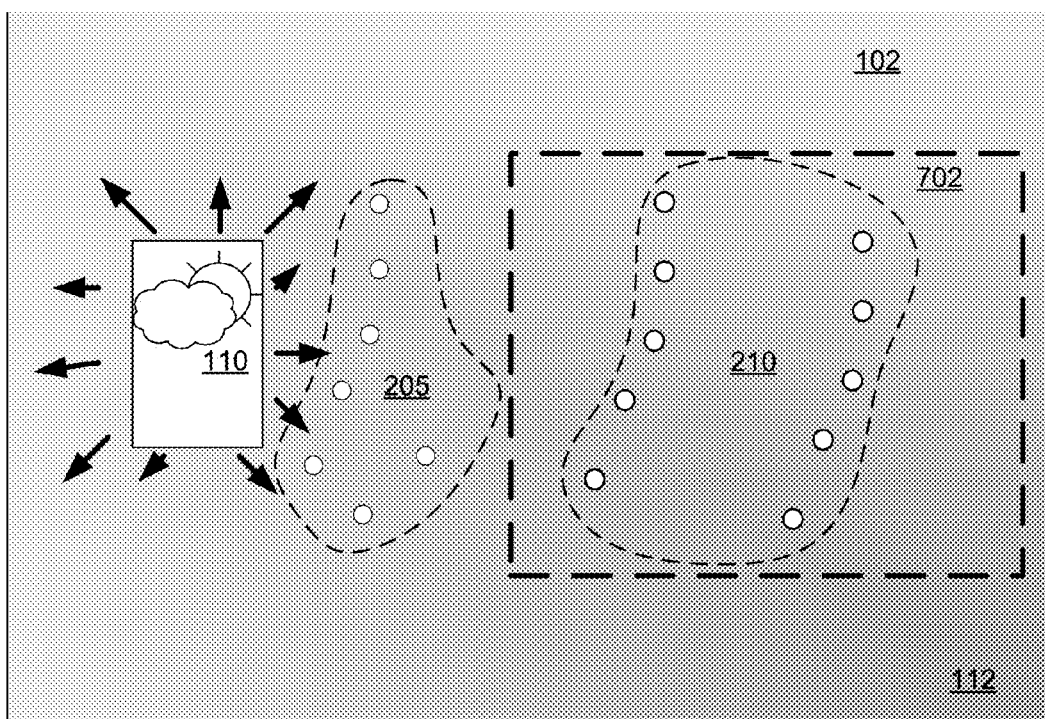

FIGS. 7A and 7B show a sequence of images taken of different portions of the environment 102 using an example implementation of camera setting adjustment based on predicted environmental factors as disclosed herein. In FIG. 7A, a first image 701 is taken of a leftward portion of the back wall of the environment 102 with camera settings, including exposure settings, similar to those of FIG. 2. The camera is then moved or rotated, and a second image 702 of a rightward portion of the back wall is taken. The direction that the camera is moving is determined. As discussed in more detail below in connection with FIGS. 8 and 9, the determined direction is used to predict, estimate, or determine camera settings, such as the exposure settings. The predicted settings, including the exposure settings, are then used for the next image.

In the example of FIGS. 7A and 7B, it is determined that the camera is moving to the right. Knowing, for example, that the environment is darker to the right, it can be determined to adjust the camera settings, such as exposure settings, for less light. Having thus been adjusted based on the predicted settings, the camera takes the second image 702 of FIG. 7B without having to wait for, or perform, auto-adjustments that result in unacceptable loss of images.

In some examples, inertial measurement, gyroscopes and/or accelerometers are used to measure and/or predict motion. Additionally or alternatively, dead reckoning based on speed and direction can be used. In some examples, motion prediction and/or detection is low-pass filtered to reduce movement dithering, e.g., movement of a few degrees per second back and forth. An example camera is a grayscale fisheye camera with a 220° field-of-view.

Exposure prediction may be performed in a number of ways. For example, using areas of an image, using a map from a tracking system, using light metering zones of a camera, combinations thereof, etc.

In some implementations, areas of an image are used to determine a gradient for an environmental factor. For example, the light level may increase across the image horizontally so that the right side of the image has a higher light level than the left side of the image. If it is then determined that the field of view of the camera is moving from left to right, the camera settings may be adjusted to be better adapted to a higher light level (i.e., better adapted to the predicted environmental factors of the predicted location of the field of view of the camera).

Figures 8, 9:
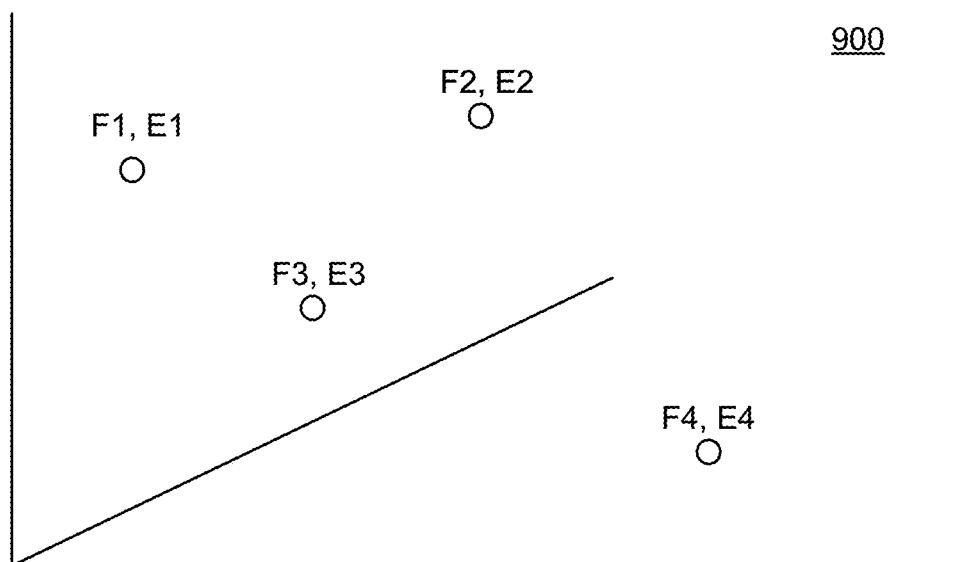
FIG. 8 is a diagram illustrating example light level zones of an image.
FIG. 9 is a diagram illustrating a feature tracking map having exposure data.

FIG. 8 shows example image 800 that is divided into a plurality of example areas (two of which are designated at reference numerals 805 and 806). Although these areas are shown as uniform rectangular regions in FIG. 8, in some implementations the areas have other shapes or non-uniform shapes. Each of the areas 805, 806 have an associated amount of light that was captured, as signified in FIG. 8 as "bright," "very bright," "dim," "dark," and "very dark." Knowing that the camera was pointed at area 805 when the image 800 was taken, predicted motion (e.g., rightward toward area 806) can be used to determine that exposure should be changed from that associated with a brightly exposed subject to that associated with a darkly lit subject.

In some implementations, the areas of an image are processed to extract features and the extracted features are associated with quality values. For example, features that are less useful in tracking or lead to outlier results in tracking may be associated with a lower quality value. As camera settings are determined based on motion and environmental factors of a predicted future field of view of the camera, the quality scores may be used. For example, the environmental factors of multiple areas in the predicted future field of view may be combined in a way that weights the areas based on the quality scores. The combined environmental factors may then be used to determine camera settings.

In some implementations, areas with lower quality scores (e.g., scores below a threshold value) may be excluded from consideration in determining camera settings. For example, a portion of an image may include a view through a window. Any features extracted from the outside environments (e.g., as seen through the window) are likely to be less useful than features extracted from the inside environment in tracking movement within the inside environment. Accordingly, features extracted from the portion of the image that shows the outside environment may be assigned lower quality scores. Additionally, this portion of the image may have a much higher light level than the rest of the image (which may skew the light level determined for the entire image if a simple average is used). Based on the lower quality score, the portion of the image showing the outside environment may be excluded from consideration when determining camera settings. In this manner, the environmental factors relevant to the regions that will provide useful features for tracking purposes are given greater consideration in determining environmental factors.

In at least some implementations, a map 900 of the location of features F1, F2, F3, F4 in an environment is known (see FIG. 9). The map is used together with the extraction of features from an image to determine the location and/or movement direction of an object and/or person. The map may be defined during a training or learning operation or phase, and subsequently used to determine locations or movement. The map may also be retrieved from a remote computing system.

In disclosed examples, such as that shown in FIG. 9, environmental information E1, E2, E3, E4, such as light levels or exposure information, is stored as a part of the map and may be associated with the features F1, F2, F3, F4. Knowing a current location and direction of movement, the location of the next image can be predicted. The predicted location can be used to identify a feature F1, F2, F3, F4 at or near the predicted location, and the environmental information associated with the identified feature can be used to take the next image. In some examples, multiple features may be identified and their respective environmental information used to determine camera settings, such as exposure settings, for the next image. There may be different maps for different times-of-day, seasons, weather, lighting conditions, etc. The environmental information may be defined during the training or learning operation or phase, or may be defined or learned as images are taken during use in an environment. The map may also include quality scores associated with the features that indicate how useful the feature is likely to be for tracking purposes.

Additionally or alternatively, more than one camera may be used to take images. The cameras each take an image at the same time, with each of the cameras using different camera settings, including exposure settings. For an example of two cameras, one camera takes its image 1005 (see FIG. 10) with first camera settings, including exposure settings, for more light compared to an image 1105 (see FIG. 11) taken by the other camera. The camera settings, including exposure settings, used to capture the image 1005 allow the window 110 and features 205 to be well imaged, but do not allow for capturing the features 210. The camera settings, including exposure settings, used to capture the image 1105 allow the features 210 to be well imaged, but do not allow the window 110 and the features 205 to be well imaged. By capturing and using both of the images 1005 and 1105, all the window 110 and features 205 and 210 can be well imaged. As illustrated, some of the window 110 and the features 205 and 210 may be well imaged in both images 1005 and 1105. By using multiple cameras taking images at the same time with different camera settings, such as exposure settings, features can be detected across a wider range of light levels.

In some examples, cameras use camera settings that vary by between 3-5%. For example, some implementations with two cameras use exposure settings that provide an exposure difference of 3-5%. The cameras may be disposed in different positions and/or orientations relative to each other. For example, by separating the cameras, stereoscopic information can also be obtained.

Figure 10:
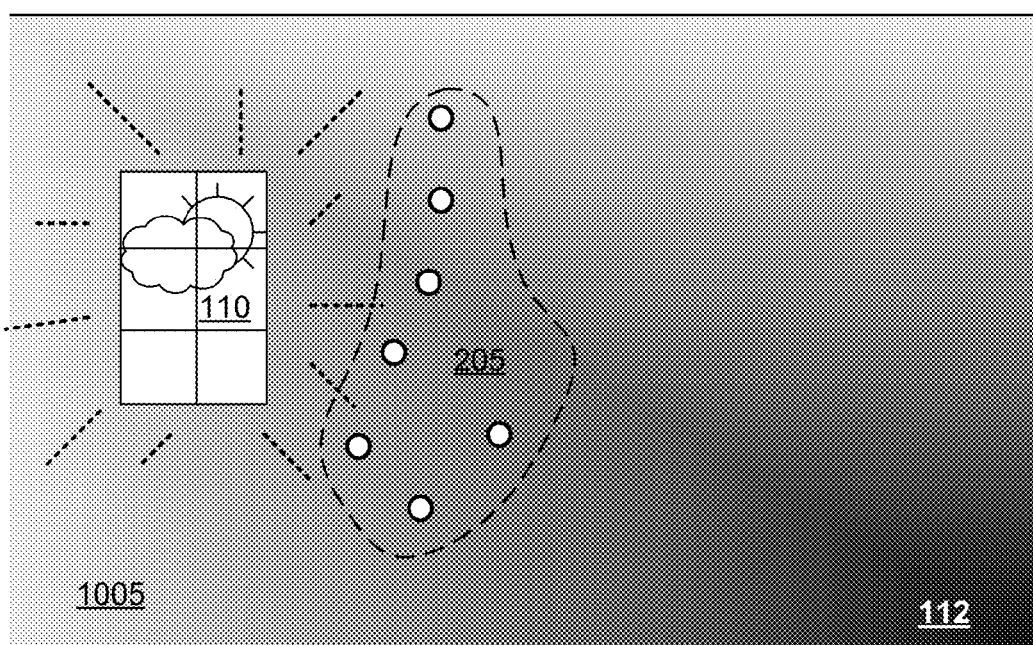
FIGS. 10 and 11 illustrate respective pictures taken of the same portion of the environment of FIG. 1 using respective cameras and respective exposure settings.
Figure 11:
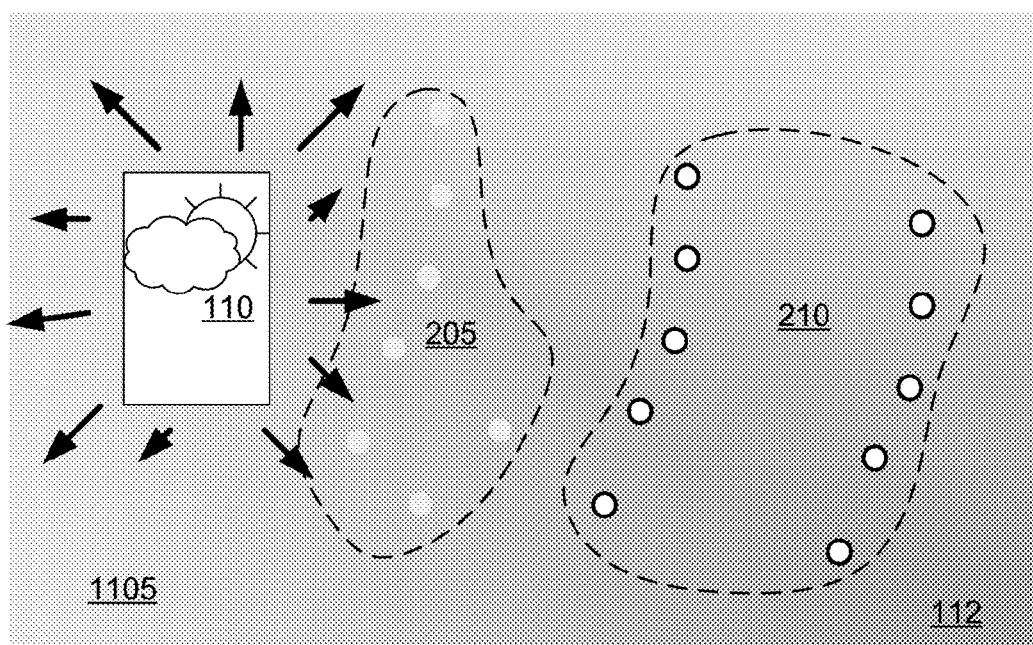
Figure 12:
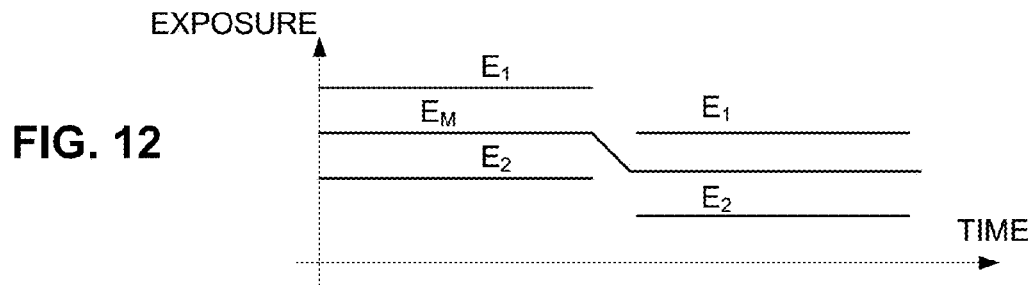
FIG. 12 is a graph illustrating example exposure tracking.

FIG. 12 is a graph showing example changes over time of exposures $E_1$ and $E_2$ for first and second cameras taking respective ones of the images 1005 and 1105 of FIGS. 10 and 11. FIG. 12 shows how the exposures $E_1$ and $E_2$ of the first and second cameras may be set relative to a main exposure $E_M$. In some examples, the exposures $E_1$ and $E_2$ for the 2 cameras are held at fixed opposite differences from the main exposure $E_M$. In the example of FIG. 12, the main exposure $E_M$ tracks (i.e., is changed to or modified to be more similar to) the exposure of the camera providing images with more useful features. For instance, in FIG. 12, the second camera is providing the most features, and the main exposure $E_M$ is changed to exposure $E_2$. In some implementations, quality values of the features are also used in determining how the main exposure $E_M$ should be adjusted.

In some examples, a main exposure $E_M$ tracks the overall exposure of the images, with the exposures $E_1$ and $E_2$ of the cameras set relative to the main exposure $E_M$. As the amount of light in images changes, the main exposure $E_M$ changes to track the changes in the images (e.g., by adjusting to be more similar to the one of exposures $E_1$ and $E_2$ that included the most features, the most useful or usable features, the highest quality features, etc.). Although the example of FIG. 12 relates to exposure settings, some implementations adjust other camera settings in a similar manner too.

As described above, setting adjustment, including exposure setting adjustment, based on predicted environmental factors may be used together with multiple cameras. For example, setting adjustment based on predicted environmental factors may be used to set the camera settings of a first camera (as described above), with a second camera set to an offset from the camera settings for the first camera.

In some implementations that include a single camera, a similar technique to that described above for multiple cameras may be used to adjust the camera settings by testing different camera settings over time and comparing the features that are captured. For example, the system may maintain a main exposure $E_M$. The system may then perform a settings test that involves capturing a first image using an exposure $E_1$ that is offset in a first direction from the main exposure $E_M$ and then capturing a second image using an exposure $E_2$ that is offset from the main exposure $E_M$ in the opposite direction. The features that are captured in the two images can be compared and the main exposure $E_M$ can be adjusted to or towards the exposure that provided for better feature capture. This process of alternating between capturing images with camera settings that have a positive offset and camera settings that have a negative offset can be used continuously. Alternatively, this process can be used during certain measurement events, such as on various intervals during the tracking process.

Figure 13:
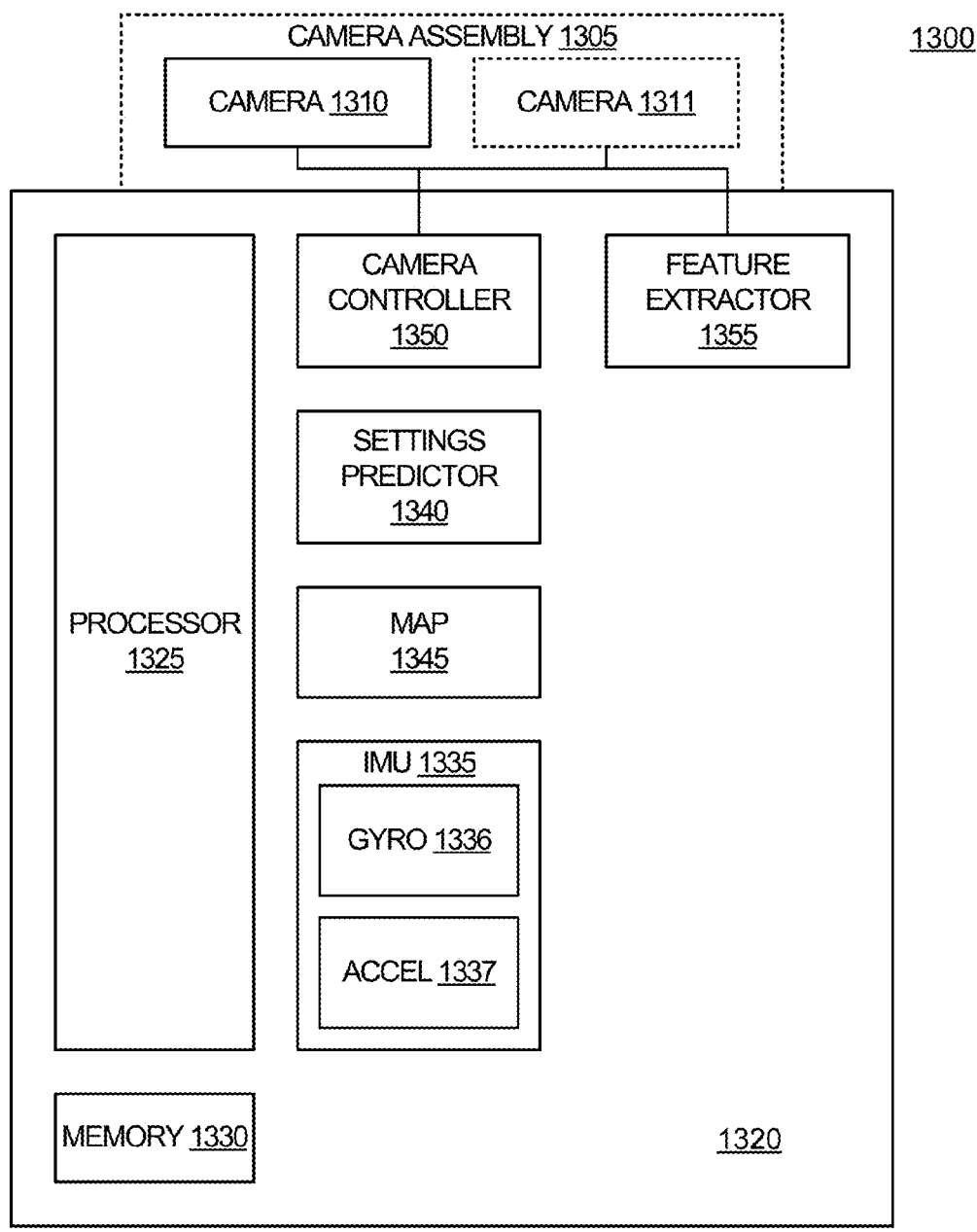
FIG. 13 is a schematic diagram that illustrates an example camera apparatus in accordance with the teachings of this disclosure.

FIG. 13 is a schematic diagram of an example device 1300 having one or more cameras that may be used, among other things, to implement camera setting adjustment based on predicted environmental factors. In some examples, the predictive adaptive camera setting adjustment may be implemented as part of a tracking system. The example device 1300 of FIG. 13 includes a camera assembly 1305, and a control module 1320. The camera assembly 1305 has one or more cameras 1310 and 1311.

The module 1320, and the elements therein, may be implemented using any number and/or type(s) of components and/or machine-readable instructions. In some examples, the control module 1320 is implemented using a mobile device such as a mobile phone, a smartphone, or a tablet that can be communicatively and/or physically coupled to, for example, a head mounted device, which provides the camera(s) 1310, 1311.

To control the device 1300, the example control module 1320 of FIG. 13 includes a processor 1325 in the form of a microcontroller, a central processing unit (CPU), an ASIC, a digital signal processor (DSP), an FPGA, a graphics processing unit (GPU), etc. programmed or configured to execute machine-readable instructions stored in a memory 1330. In some examples, the instructions, when executed, cause the processor 1325 to, among other things, implement camera setting adjustment based on predicted environmental factors, including predictive adaptive exposure settings adjustment. In some examples, the device 1300 implements a tracking system, such as a tracking system to generate an augmented reality environment based, at least in part, on tracked features in the environment. In some examples, more than one processor 1325 and/or memory 1330 are provided. The module 1320 may be communicatively coupled to other devices, including the cameras 1310, 1311, via, for example, a communication module that implements communication signals and/or protocols, such as Bluetooth®, Wi-Fi®, and universal serial bus (USB).

To measure or predict motion, the example control module 1320 includes an inertial measurement unit (IMU) 1335. An example IMU 1335 is a self-contained system that measures linear acceleration and/or angular motion. The example IMU 1335 includes a triad of gyroscopes 1336 and a triad of accelerometers 1337. In some implementations, the IMU 1335 includes one or more accelerometers, gyroscopes, magnetometers, and other such sensors. The IMU 1335 may detect motion, movement, and/or acceleration.

To predict a future amount of light in an image, the example module 1320 has a settings predictor 1340. Using current location and inertial data from the IMU 1335, the settings predictor 1340 predicts the location at which the next image is anticipated to be taken and/or the field of view of the next image. In some examples, the settings predictor 1340 obtains camera settings, such as exposure settings, for the predicted location from a tracking map 1345. In some examples, the settings predictor 1340 uses zones of an image to predict the camera settings for the predicted location (e.g., see FIG. 8). In some instances, the settings predictor 1340 extrapolates beyond the image if the predicted location falls outside the boundary of the image. For example, in FIG. 8, if the predicted location (e.g., an area to the right of area 806) is beyond the boundary of image 800, the settings predictor 1340 can determine that the camera is moving from the area 805, which is "bright," past an area 806, which is "dark," and, thus, the predicted location will likely be "very dark" given the progression from "bright" to "dark."

To control the camera(s) 1310, 1311, the example module 1320 has a camera controller 1350. Using, for example, an application programming interface (API) provided by a manufacturer or vendor of the camera(s) 1310, 1311, the camera controller 1350 sets the settings (e.g., exposure setting(s)) of the camera(s) 1310, 1311, triggers image capture, and reads image(s) from the camera(s) 1310, 1311. The images can be retained (e.g., in the memory 1330), and/or forwarded onto another device. In some examples, the module 1320 and the camera(s) 1310, 1311 are implemented separately, and the camera controller 1350 communicates with the camera(s) 1310, 1311 via wired or wireless communication.

In some examples, the module 1320 includes a feature extractor 1355 that extracts features from images using any number and/or type(s) of algorithms, methods and/or circuits. Additionally or alternatively, images may be sent to another device for feature extraction.

Figure 14:
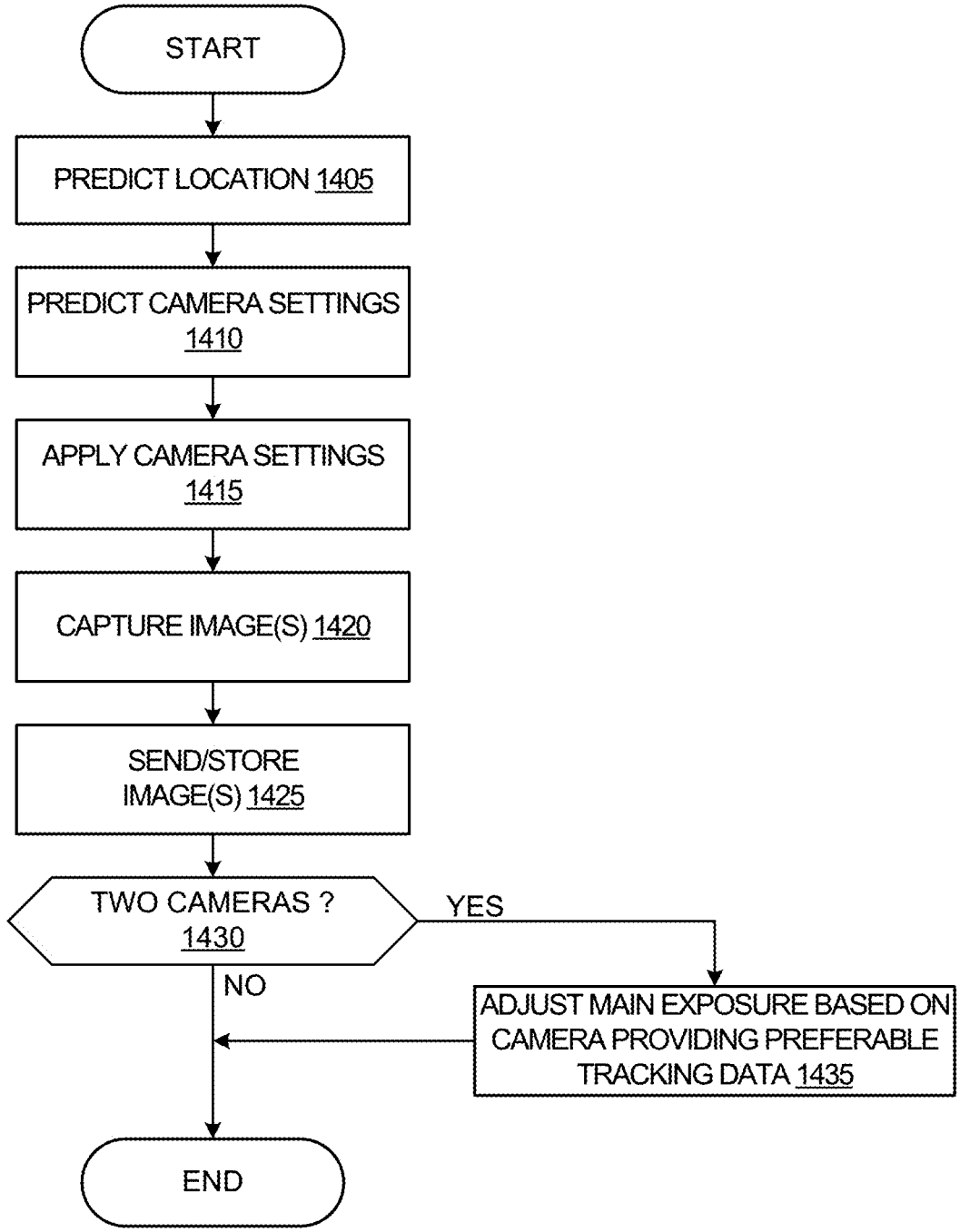
FIG. 14 is a flowchart representing an example method that may be used to implement a camera apparatus in accordance with the teachings of this disclosure.
Figure 15:
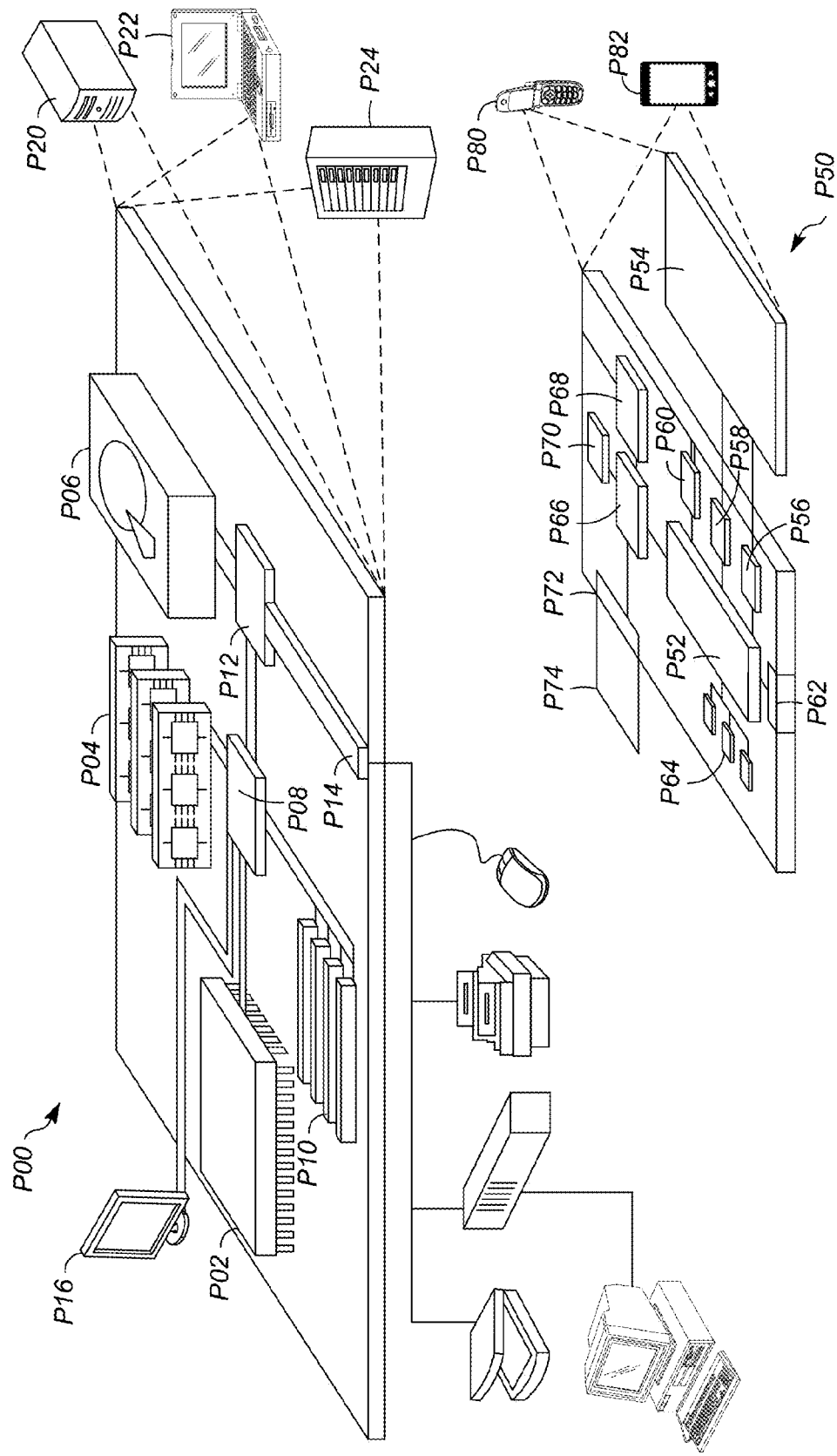
FIG. 15 is a block diagram of an example computer device and an example mobile computer device, which may be used to implement the examples disclosed herein.

FIG. 14 is a flowchart of an example method that may, for example, be implemented as machine-readable instructions carried out by one or more processors, such as the example processors P00 and P50 of FIG. 15, to implement the example camera settings adjustment and tracking systems disclosed herein. The example method of FIG. 14 includes predicting a location from which an image will be taken by, for example, the settings predictor 1340 of FIG. 13 (block 1405). Predicting or determining camera setting(s) for the predicted location by, for example, the settings predictor 1340 (block 1410). Camera settings are applied to the camera(s) (block 1415) and images are taken (block 1420) by, for example, the camera controller 1350 controlling the camera(s). The images are sent and/or stored (block 1425). If two cameras are used (block 1430), then a main exposure is adjusted based on the camera providing the better feature extraction (block 1435). Control then exits from the example method of FIG. 14.

One or more of the elements and interfaces disclosed herein may be duplicated, implemented in the parallel, implemented in the singular, combined, divided, re-arranged, omitted, eliminated and/or implemented in any other way. Further, any of the disclosed elements and interfaces may be implemented by the example processor platforms P00 and P50 of FIG. 15, and/or one or more circuit(s), programmable processor(s), fuses, application-specific integrated circuit(s) (ASIC(s)), programmable logic device(s) (PLD(s)), field-programmable logic device(s) (FPLD(s)), and/or field-programmable gate array(s) (FPGA(s)), etc. Any of the elements and interfaces disclosed herein may, for example, be implemented as machine-readable instructions carried out by one or more processors. A processor, a controller and/or any other suitable processing device such as those shown in FIG. 15 may be used, configured and/or programmed to execute and/or carry out the examples disclosed herein. For example, any of these interfaces and elements may be embodied in program code and/or machine-readable instructions stored on a tangible and/or non-transitory computer-readable medium accessible by a processor, a computer and/or other machine having a processor, such as that discussed below in connection with FIG. 15. Machine-readable instructions comprise, for example, instructions that cause a processor, a computer and/or a machine having a processor to perform one or more particular processes. The order of execution of methods may be changed, and/or one or more of the blocks and/or interactions described may be changed, eliminated, sub-divided, or combined. Additionally, they may be carried out sequentially and/or carried out in parallel by, for example, separate processing threads, processors, devices, discrete logic, circuits, etc.

The example methods disclosed herein may, for example, be implemented as machine-readable instructions carried out by one or more processors. A processor, a controller and/or any other suitable processing device such as that shown in FIG. 15 may be used, configured and/or programmed to execute and/or carry out the example methods. For example, they may be embodied in program code and/or machine-readable instructions stored on a tangible and/or non-transitory computer-readable medium accessible by a processor, a computer and/or other machine having a processor, such as that discussed below in connection with FIG. 15. Machine-readable instructions comprise, for example, instructions that cause a processor, a computer and/or a machine having a processor to perform one or more particular processes. Many other methods of implementing the example methods may be employed. For example, the order of execution may be changed, and/or one or more of the blocks and/or interactions described may be changed, eliminated, sub-divided, or combined. Additionally, any or the entire example methods may be carried out sequentially and/or carried out in parallel by, for example, separate processing threads, processors, devices, discrete logic, circuits, etc.

As used herein, the term "computer-readable medium" is expressly defined to include any type of computer-readable medium and to expressly exclude propagating signals. Example computer-readable medium include, but are not limited to, one or any combination of a volatile and/or non-volatile memory, a volatile and/or non-volatile memory device, a compact disc (CD), a digital versatile disc (DVD), a read-only memory (ROM), a random-access memory (RAM), a programmable ROM (PROM), an electronically-programmable ROM (EPROM), an electronically-erasable PROM (EEPROM), an optical storage disk, an optical storage device, a magnetic storage disk, a magnetic storage device, a cache, and/or any other storage media in which information is stored for any duration (e.g., for extended time periods, permanently, brief instances, for temporarily buffering, and/or for caching of the information) and that can be accessed by a processor, a computer and/or other machine having a processor.

Returning to FIG. 1, the example AR system 100 includes any number of computing and/or electronic devices that can exchange data over a network 120. The devices may represent clients or servers, and can communicate via the network 120 or any other additional and/or alternative network(s). Example client devices include, but are not limited to, a mobile device 131 (e.g., a smartphone, a personal digital assistant, a portable media player, etc.), an electronic tablet (not shown), a laptop or netbook 132, a camera (not shown), the HMD 106, a desktop computer 133, a handheld controller, a gaming device (not shown), and any other electronic or computing devices that can communicate using the network 120 or other network(s) with other computing or electronic devices or systems, or that may be used to access AR content or operate within an AR environment. The devices 131-133 may represent client or server devices. The HMD 106 and computing devices 131-133 can execute a client operating system, and one or more client applications that can access, render, provide, or display AR content on a display device included in or in conjunction with each respective device 106 and 131-133.

The AR system 100 may include any number of AR content systems 140 storing content and/or AR software modules (e.g., in the form of AR applications 144) that can generate, modify, and/or execute AR scenes. In some examples, the HMD 106, the devices, 131-133, and the AR content system 140 include one or more processors and one or more memory devices, which can execute a client operating system and one or more client applications. The HMD 106, the other devices 131-133, or the AR content system 140 may be implemented by the example computing devices P00 and P50 of FIG. 15.

The AR applications 144 can be configured to execute on the HMD 106 and/or any or all of the devices 131-133. The HMD 106 can be connected to the devices 131-133 to access AR content on AR content system 140, for example. The devices 131-133 can be connected (wired or wirelessly) to the HMD 106, which can provide AR content for display. A user's AR system can be the HMD 106 alone, or a combination of the devices 131-133 and HMD 106.

The HMD 106 may represent an AR HMD, glasses, an eyepiece, or any other wearable device capable of displaying AR content. In some instances, the HMD 106 includes cameras. In operation, the HMD 106 can execute an AR application 144 that can playback received, rendered, and/or processed images for a user. In some instances, the AR application 144 can be hosted by one or more of the devices 131-133.

In some implementations, one or more content servers (e.g., AR content system 140) and one or more computer-readable storage devices can communicate with the HMD 106 and the computing devices 131-134 using the network 120 to provide AR content to the HMD 106 and devices 131-134.

In some implementations, the mobile device 131 can execute the AR application 144 and provide the content for the AR environment. In some implementations, the laptop computing device 132 can execute the AR application 144 and can provide content from one or more content servers (e.g., AR content server 140). The one or more content servers and one or more computer-readable storage devices can communicate with the mobile device 131 and/or laptop computing device 132 using the network 120 to provide content for display in the HMD 106.

In the event that the HMD 106 is wirelessly coupled to any of the devices 131-133, the coupling may include use of any wireless communication protocol. A non-exhaustive list of wireless communication protocols that may be used individually or in combination includes, but is not limited to, the Institute of Electrical and Electronics Engineers (IEEE®) family of 802.x standards a.k.a. Wi-Fi or wireless local area network (WLAN), Bluetooth, Transmission Control Protocol/Internet Protocol (TCP/IP), a satellite data network, a cellular data network, a Wi-Fi hotspot, the Internet, and a wireless wide area network (WWAN).

In the event that the HMD 106 is electrically coupled to any of the devices 131-133, a cable with an appropriate connector on either end for plugging into the devices 131-133 can be used. A non-exhaustive list of wired communication protocols that may be used individually or in combination includes, but is not limited to, IEEE 802.3x (Ethernet), a powerline network, the Internet, a coaxial cable data network, a fiber optic data network, a broadband or a dialup modem over a telephone network, a private communications network (e.g., a private local area network (LAN), a leased line, etc.).

A cable can include a Universal Serial Bus (USB) connector on both ends. The USB connectors can be the same USB type connector or the USB connectors can each be a different type of USB connector. The various types of USB connectors can include, but are not limited to, USB A-type connectors, USB B-type connectors, micro-USB A connectors, micro-USB B connectors, micro-USB AB connectors, USB five pin Mini-b connectors, USB four pin Mini-b connectors, USB 3.0 A-type connectors, USB 3.0 B-type connectors, USB 3.0 Micro B connectors, and USB C-type connectors. Similarly, the electrical coupling can include a cable with an appropriate connector on either end for plugging into the HMD 106 and any of the devices 131-133. For example, the cable can include a USB connector on both ends. The USB connectors can be the same USB type connector or the USB connectors can each be a different type of USB connector. Either end of a cable used to couple the device 131-133 to the HMD 106 may be fixedly connected to the device 131-133 and/or HMD 106.

FIG. 15 shows an example of a generic computer device P00 and a generic mobile computer device P50, which may be used with the techniques described here. Computing device P00 is intended to represent various forms of digital computers, such as laptops, desktops, tablets, workstations, personal digital assistants, televisions, servers, blade servers, mainframes, and other appropriate computing devices. Computing device P50 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device P00 includes a processor P02, memory P04, a storage device P06, a high-speed interface P08 connecting to memory P04 and high-speed expansion ports P10, and a low speed interface P12 connecting to low speed bus P14 and storage device P06. The processor P02 can be a semiconductor-based processor. The memory P04 can be a semiconductor-based memory. Each of the components P02, P04, P06, P08, P10, and P12, are interconnected using various busses, and may be mounted on a common motherboard or in other manners as appropriate. The processor P02 can process instructions for execution within the computing device P00, including instructions stored in the memory P04 or on the storage device P06 to display graphical information for a GUI on an external input/output device, such as display P16 coupled to high speed interface P08. In other implementations, multiple processors and/or multiple buses may be used, as appropriate, along with multiple memories and types of memory. Also, multiple computing devices P00 may be connected, with each device providing portions of the necessary operations (e.g., as a server bank, a group of blade servers, or a multi-processor system).

The memory P04 stores information within the computing device P00. In one implementation, the memory P04 is a volatile memory unit or units. In another implementation, the memory P04 is a non-volatile memory unit or units. The memory P04 may also be another form of computer-readable medium, such as a magnetic or optical disk.

The storage device P06 is capable of providing mass storage for the computing device P00. In one implementation, the storage device P06 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory P04, the storage device P06, or memory on processor P02.

The high speed controller P08 manages bandwidth-intensive operations for the computing device P00, while the low speed controller P12 manages lower bandwidth-intensive operations. Such allocation of functions is exemplary only. In one implementation, the high-speed controller P08 is coupled to memory P04, display P16 (e.g., through a graphics processor or accelerator), and to high-speed expansion ports P10, which may accept various expansion cards (not shown). In the implementation, low-speed controller P12 is coupled to storage device P06 and low-speed expansion port P14. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device P00 may be implemented in a number of different forms, as shown in the figure. For example, it may be implemented as a standard server P20, or multiple times in a group of such servers. It may also be implemented as part of a rack server system P24. In addition, it may be implemented in a personal computer such as a laptop computer P22. Alternatively, components from computing device P00 may be combined with other components in a mobile device (not shown), such as device P50. Each of such devices may contain one or more of computing device P00, P50, and an entire system may be made up of multiple computing devices P00, P50 communicating with each other.

Computing device P50 includes a processor P52, memory P64, an input/output device such as a display P54, a communication interface P66, and a transceiver P68, among other components. The device P50 may also be provided with a storage device, such as a microdrive or other device, to provide additional storage. Each of the components P50, P52, P64, P54, P66, and P68, are interconnected using various buses, and several of the components may be mounted on a common motherboard or in other manners as appropriate.

The processor P52 can execute instructions within the computing device P50, including instructions stored in the memory P64. The processor may be implemented as a chipset of chips that include separate and multiple analog and digital processors. The processor may provide, for example, for coordination of the other components of the device P50, such as control of user interfaces, applications run by device P50, and wireless communication by device P50.

Processor P52 may communicate with a user through control interface P58 and display interface P56 coupled to a display P54. The display P54 may be, for example, a TFT LCD (Thin-Film-Transistor Liquid Crystal Display) or an OLED (Organic Light Emitting Diode) display, or other appropriate display technology. The display interface P56 may comprise appropriate circuitry for driving the display P54 to present graphical and other information to a user. The control interface P58 may receive commands from a user and convert them for submission to the processor P52. In addition, an external interface P62 may be provided in communication with processor P52, so as to enable near area communication of device P50 with other devices. External interface P62 may provide, for example, for wired communication in some implementations, or for wireless communication in other implementations, and multiple interfaces may also be used.

The memory P64 stores information within the computing device P50. The memory P64 can be implemented as one or more of a computer-readable medium or media, a volatile memory unit or units, or a non-volatile memory unit or units. Expansion memory P74 may also be provided and connected to device P50 through expansion interface P72, which may include, for example, a SIMM (Single In Line Memory Module) card interface. Such expansion memory P74 may provide extra storage space for device P50, or may also store applications or other information for device P50. Specifically, expansion memory P74 may include instructions to carry out or supplement the processes described above, and may include secure information also. Thus, for example, expansion memory P74 may be provide as a security module for device P50, and may be programmed with instructions that permit secure use of device P50. In addition, secure applications may be provided via the SIMM cards, along with additional information, such as placing identifying information on the SIMM card in a non-hackable manner.

The memory may include, for example, flash memory and/or NARAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory P64, expansion memory P74, or memory on processor P52 that may be received, for example, over transceiver P68 or external interface P62.

Device P50 may communicate wirelessly through communication interface P66, which may include digital signal processing circuitry where necessary. Communication interface P66 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver P68. In addition, short-range communication may occur, such as using a Bluetooth, Wi-Fi, or other such transceiver (not shown). In addition, GPS (Global Positioning System) receiver module P70 may provide additional navigation- and location-related wireless data to device P50, which may be used as appropriate by applications running on device P50.

Device P50 may also communicate audibly using audio codec P60, which may receive spoken information from a user and convert it to usable digital information. Audio codec P60 may likewise generate audible sound for a user, such as through a speaker, e.g., in a handset of device P50. Such sound may include sound from voice telephone calls, may include recorded sound (e.g., voice messages, music files, etc.) and may also include sound generated by applications operating on device P50.

The computing device P50 may be implemented in a number of different forms, as shown in the figure. For example, it may be implemented as a cellular telephone P80. It may also be implemented as part of a smart phone P82, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the embodiments disclosed herein unless the element is specifically described as "essential" or "critical".

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A system comprising:
   a camera assembly;
   at least one processor; and
   a memory storing instructions that, when executed by the at least one processor, cause the system to:
      determine a direction of movement of the camera assembly;
      predict a location of the camera assembly based on the direction of movement;
      responsive to predicting the location of the camera assembly, predict a light level at the predicted location by identifying a brightness gradient in a previously captured image and using the brightness gradient to predict the light level at the predicted location;
      determine an exposure setting for the camera assembly based on the predicted light level;
      predictively adjust the camera assembly based on the determined exposure setting; and
      capture an image with the camera assembly using the determined exposure setting.

2. The system of claim 1, wherein the instructions that cause the system to determine the direction of movement of the camera assembly, comprise instructions that cause the system to:
   extract a first set of features from a first previously captured image;

extract a second set of features from a second previously captured image, the second previously captured image having been captured after the first previously captured image;
identify a plurality of common features that are in both the first set of features and the second set of features; and
predict the direction of movement based on the positions of at least some of the common features in the first previously captured image relative to the second previously captured image.

3. The system of claim 1, wherein the system further comprises an inertial measurement unit (IMU) and the instructions that cause the system to determine the direction of movement of the camera assembly, comprise instructions that cause the system to determine the direction of movement using the IMU.

4. The system of claim 1, wherein the instructions that cause the system to predict the light level at the predicted location, comprise instructions that cause the system to predict the light level based on data about the predicted location that is retrieved from an environmental map.

5. The system of claim 1, wherein the camera assembly includes a first camera and a second camera, and wherein the instructions that cause the system to determine the exposure setting based on the predicted light level, comprise instructions that cause the system to:
determine a main exposure setting based on the predicted light level;
apply a negative offset to the main exposure setting to generate a negative offset exposure setting;
apply a positive offset to the main exposure setting to generate a positive offset exposure setting;
adjust the first camera based on the negative offset exposure setting; and
adjust the second camera based on the positive offset exposure setting.

6. The system of claim 5, wherein the instructions that cause the system to determine the exposure setting based on the predicted light level, further comprise instructions that cause the system to:
determine a number of usable features captured by the first camera and a number of usable features captured by the second camera;
responsive to determining the number of usable features captured by the first camera is greater than the number of usable features captured by the second camera:
generate an adjusted main exposure setting based on the main exposure setting and the negative offset exposure setting;
apply the negative offset to the adjusted main exposure setting to generate an adjusted negative offset exposure setting;
apply the positive offset to the adjusted main exposure setting to generate an adjusted positive offset exposure setting;
adjust the first camera based on the adjusted negative offset exposure setting; and
adjust the second camera based on the adjusted positive offset exposure setting.

7. The system of claim 1, wherein the instructions further comprise instructions that cause the system to track an entity using images captured by the camera assembly.

8. A non-transitory computer-readable storage medium comprising instructions stored thereon that, when executed by at least one processor, are configured to cause a computing system to at least:
capture a first image with a camera of a moving camera assembly;
predict a future field of view of the moving camera assembly;
responsive to predicting the future field of view, divide the predicted field of view of the camera into a plurality of regions;
predict light levels within at least some of the plurality of regions;
estimate a number of useable features in at least some of the plurality of regions;
combine the predicted light levels by weighting the regions based on the estimated numbers of usable features;
determine an exposure setting based on the combined predicted light level;
adjust the camera based on the exposure setting determined based on the predicted light level; and
capture a second image with the camera using the determined exposure setting.

9. The non-transitory computer-readable storage medium of claim 8, further comprising instructions that cause the computing system to use a map to estimate the number of useable features in at least some of the plurality of regions.

10. The non-transitory computer-readable storage medium of claim 9, wherein a usable feature is determined based on a quality score assigned to the feature exceeding a threshold value.

11. A method of tracking an entity:
capturing a first image with a camera of a moving camera assembly;
predicting a location of the moving camera assembly;
predicting a future field of view of the camera based on the predicted location of the moving camera assembly;
responsive to predicting the future field of view of the camera, predicting a light level within the predicted future field of view;
determining an exposure setting based on the predicted light level to improve capture of at least some features of a set of features extracted from a previously captured image, wherein the features are associated with quality values and the exposure setting is determined to improve capture of the at least some of the extracted set of features based on the quality values;
adjusting the camera based on the exposure setting determined based on the predicted light level; and
capturing a second image with the camera using the determined exposure setting.

12. The method of claim 11, wherein the predicted light level is retrieved from an environment map.

13. The method of claim 11, further comprising extracting a set of features from the first image, and wherein the determining the exposure setting based on the predicted light level includes determining the exposure setting based on the predicted light level to improve capture of at least some of the extracted set of features.

14. The non-transitory computer-readable storage medium of claim 8, further comprising instructions that cause the computing system to extract a set of features from the first image and wherein the instructions that cause the computing system to determine the exposure setting based on the predicted light level include instructions that cause the computing system to determine the exposure setting based on the predicted light level to improve capture of at least some of the extracted set of features.

15. The system of claim 1, wherein the instructions that cause the system to predictively adjust the camera assembly include instructions that cause the system to adjust camera settings of the camera assembly based on a predicted future location of the camera assembly.

16. A system comprising:
a camera assembly that includes a first camera and a second camera;
at least one processor; and
a memory storing instructions that, when executed by the at least one processor, cause the system to:
  determine a direction of movement of the camera assembly;
  predict environmental factors based on the direction of movement;
  determine main camera settings based on the environmental factors;
  apply a negative offset to the main camera settings to generate negative offset camera settings;
  apply a positive offset to the main camera settings to generate positive offset camera settings;
  adjust the first camera based on the negative offset camera settings;
  adjust the second camera based on the positive offset camera settings; and
  capture an image with the first camera using the negative offset camera settings and an image with the adjusted second camera using the positive offset camera settings.

17. The system of claim 16, wherein the instructions that cause the system to determine the main camera settings based on the environmental factors, further comprise instructions that cause the system to:
determine a number of usable features captured by the first camera and a number of usable features captured by the second camera;
responsive to determining the number of usable features captured by the first camera is greater than the number of usable features captured by the second camera:
  generate adjusted main camera settings based on the main camera settings and the negative offset camera settings;
  apply the negative offset to the adjusted main camera settings to generate adjusted negative offset camera settings;
  apply the positive offset to the adjusted main camera settings to generate adjusted positive offset camera settings;
  adjust the first camera based on the adjusted negative offset camera settings; and
  adjust the second camera based on the adjusted positive offset camera settings.

18. A system comprising:
a camera assembly;
at least one processor; and
a memory storing instructions that, when executed by the at least one processor, cause the system to:
  determine a direction of movement of the camera assembly;
  predict a location of the camera assembly based on the direction of movement;
  responsive to predicting the location of the camera assembly, predict a light level at the predicted location based on data about the predicted location that is retrieved from an environmental map;
  determine an exposure setting for the camera assembly based on the predicted light level;
  predictively adjust the camera assembly based on the determined exposure setting; and
  capture an image with the camera assembly using the determined exposure setting.

19. The system of claim 18, wherein the system further comprises an inertial measurement unit (IMU) and the instructions that cause the system to determine the direction of movement of the camera assembly, comprise instructions that cause the system to determine the direction of movement using the IMU.

* * * * *